US012061719B2

United States Patent
Herzberg et al.

(10) Patent No.: US 12,061,719 B2
(45) Date of Patent: Aug. 13, 2024

(54) SYSTEM AND METHOD FOR AGENTLESS DETECTION OF SENSITIVE DATA IN COMPUTING ENVIRONMENTS

(71) Applicant: Wiz, Inc., New York, NY (US)

(72) Inventors: Raaz Herzberg, Tel Aviv (IL); Avi Tal Lichtenstein, Tel Aviv (IL); Roy Reznik, Tel Aviv (IL); Ami Luttwak, Binyamina (IL); Moran Cohen, Tel Aviv (IL); Yaniv Shaked, Tel Aviv (IL); Yinon Costica, Tel Aviv (IL); George Pisha, Giv'atayim (IL)

(73) Assignee: WIZ, INC., New York, NY (US)

( * ) Notice: Subject to any disclaimer, the term of this patent is extended or adjusted under 35 U.S.C. 154(b) by 0 days.

(21) Appl. No.: 18/049,093

(22) Filed: Oct. 24, 2022

(65) Prior Publication Data
US 2024/0104240 A1    Mar. 28, 2024

Related U.S. Application Data

(60) Provisional application No. 63/377,403, filed on Sep. 28, 2022.

(51) Int. Cl.
*H04L 9/40*       (2022.01)
*G06F 16/901*    (2019.01)
(Continued)

(52) U.S. Cl.
CPC ...... *G06F 21/6245* (2013.01); *G06F 16/9024* (2019.01); *G06F 16/906* (2019.01)

(58) Field of Classification Search
CPC . G06F 21/6245; G06F 16/9024; G06F 16/906
(Continued)

(56) References Cited

U.S. PATENT DOCUMENTS 6,910,132 B1    6/2005  Bhattacharya
8,200,965 B2    6/2012  Fujibayashi et al.
(Continued)

FOREIGN PATENT DOCUMENTS

EP    4160983 A1    4/2023

OTHER PUBLICATIONS

Ali Gholami; Security and Privacy of Sensitive Data in Cloud Computing: A Survey of Recent Developments; Arix:2016; pp. 131-150.
(Continued)

*Primary Examiner* — Jeffrey C Pwu
*Assistant Examiner* — Nega Woldemariam
(74) *Attorney, Agent, or Firm* — M&B IP Analysts, LLC (57) ABSTRACT

A system and method for agentless detection of sensitive data in a cloud computing environment. The method includes detecting a first data object including a data schema and a content in a cloud computing environment; detecting a second data object, having the data schema of the first data object; generating in a security graph: a first data object node representing the first data object, a second data object node representing the second data object, and a data schema node representing the data schema; storing a classification based on the content in the security graph, wherein the content is classified as sensitive data or non-sensitive data; and rendering an output based on the classification and the data schema node, in lieu of the first data object node and the second data object node, in response to receiving a query to detect a node representing a data object classified as sensitive data.

22 Claims, 6 Drawing Sheets

(51) Int. Cl.
*G06F 16/906* (2019.01)
*G06F 21/62* (2013.01)

(58) Field of Classification Search
USPC .......................................................... 726/26
See application file for complete search history.

(56) References Cited

U.S. PATENT DOCUMENTS

| | | |
|---|---|---|
| 8,413,239 B2 | 4/2013 | Sutton |
| 8,499,354 B1 | 7/2013 | Satish et al. |
| 8,595,822 B2 | 11/2013 | Schrecker et al. |
| 8,789,049 B2 | 7/2014 | Hutchins et al. |
| 8,898,481 B1 | 11/2014 | Osburn, III et al. |
| 8,914,406 B1 | 12/2014 | Haugsnes |
| 9,009,836 B1 | 4/2015 | Yarykin et al. |
| 9,119,017 B2 | 8/2015 | Sinha |
| 9,165,142 B1 | 10/2015 | Sanders et al. |
| 9,172,621 B1 | 10/2015 | Dippenaar |
| 9,330,273 B2 | 5/2016 | Khetawat et al. |
| 9,369,433 B1 | 6/2016 | Paul |
| 9,419,996 B2 | 8/2016 | Porat |
| 9,438,634 B1 | 9/2016 | Ross et al. |
| 9,467,473 B2 | 10/2016 | Jayaraman |
| 9,544,327 B1 | 1/2017 | Sharma et al. |
| 9,563,385 B1 | 2/2017 | Kowalski et al. |
| 9,569,328 B2 | 2/2017 | Pavlov et al. |
| 9,582,662 B1 | 2/2017 | Messick et al. |
| 9,607,104 B1 | 3/2017 | Turner et al. |
| 9,646,172 B1 | 5/2017 | Hahn |
| 9,661,009 B1 | 5/2017 | Karandikar et al. |
| 9,672,355 B2 | 6/2017 | Titonis et al. |
| 9,712,503 B1 | 7/2017 | Ahmed |
| 9,892,261 B2 | 2/2018 | Joram et al. |
| 10,002,247 B2 | 6/2018 | Suarez et al. |
| 10,032,032 B2 | 7/2018 | Suarez et al. |
| 10,063,445 B1 | 8/2018 | Preece |
| 10,135,826 B2 | 11/2018 | Reddy |
| 10,229,125 B2 | 3/2019 | Goodman et al. |
| 10,255,370 B2 | 4/2019 | Carpenter et al. |
| 10,360,025 B2 | 7/2019 | Foskett et al. |
| 10,412,103 B2 | 9/2019 | Haugsnes |
| 10,412,109 B2 | 9/2019 | Loureiro et al. |
| 10,503,904 B1 | 12/2019 | Singh et al. |
| 10,540,499 B2 | 1/2020 | Wailly et al. |
| 10,554,507 B1 | 2/2020 | Siddiqui et al. |
| 10,567,468 B2 | 2/2020 | Perlmutter |
| 10,572,226 B2 | 2/2020 | Biskup et al. |
| 10,574,675 B2 | 2/2020 | Peppe et al. |
| 10,623,386 B1 | 4/2020 | Bernat et al. |
| 10,630,642 B2 | 4/2020 | Clark et al. |
| 10,664,619 B1 | 5/2020 | Marelas |
| 10,691,636 B2 | 6/2020 | Tabaaloute et al. |
| 10,725,775 B2 | 7/2020 | Suarez et al. |
| 10,735,442 B1 | 8/2020 | Swackhamer |
| 10,791,138 B1 | 9/2020 | Siddiqui et al. |
| 10,803,188 B1 | 10/2020 | Rajput et al. |
| 10,831,898 B1 | 11/2020 | Wagner |
| 10,915,626 B2 | 2/2021 | Tang |
| 10,924,503 B1 | 2/2021 | Pereira et al. |
| 10,972,484 B1 | 4/2021 | Swackhamer |
| 10,997,293 B2 | 5/2021 | Wiest et al. |
| 11,005,860 B1 | 5/2021 | Glyer et al. |
| 11,044,118 B1 | 6/2021 | Reed et al. |
| 11,099,976 B2 | 8/2021 | Khakare et al. |
| 11,165,652 B1 | 11/2021 | Byrne |
| 11,216,563 B1 | 1/2022 | Veselov et al. |
| 11,245,730 B2 | 2/2022 | Bailey |
| 11,271,961 B1 | 3/2022 | Berger |
| 11,334,670 B2 | 5/2022 | Franco et al. |
| 11,366,897 B1 | 6/2022 | Ramanathan et al. |
| 11,388,183 B2 | 7/2022 | Hoopes et al. |
| 11,444,974 B1 | 9/2022 | Shakhzadyan |
| 11,496,498 B2 | 11/2022 | Wright et al. |
| 11,496,519 B1 | 11/2022 | Gupta et al. |
| 11,503,063 B2 | 11/2022 | Rao |
| 11,507,672 B1 | 11/2022 | Pagnozzi et al. |
| 11,520,907 B1 | 12/2022 | Borowiec et al. |
| 11,546,360 B2 | 1/2023 | Woodford et al. |
| 11,556,659 B1 | 1/2023 | Kumar et al. |
| 11,558,401 B1 | 1/2023 | Vashisht et al. |
| 11,558,423 B2 | 1/2023 | Gordon et al. |
| 11,567,751 B2 | 1/2023 | Cosentino et al. |
| 11,570,090 B2 | 1/2023 | Shen et al. |
| 11,614,956 B2 | 3/2023 | Tsirkin et al. |
| 11,645,390 B2 | 5/2023 | Vijayvargiya et al. |
| 11,662,928 B1 | 5/2023 | Kumar et al. |
| 11,669,386 B1 | 6/2023 | Abrol |
| 11,750,566 B1 | 9/2023 | Montilla |
| 11,757,844 B2 | 9/2023 | Xiao |
| 11,770,398 B1 | 9/2023 | Erlingsson |
| 11,792,284 B1 | 10/2023 | Nanduri |
| 11,799,874 B1 | 10/2023 | Lichtenstein et al. |
| 11,803,766 B1 | 10/2023 | Srinivasan |
| 11,841,945 B1 | 12/2023 | Fogel |
| 11,914,707 B1 | 2/2024 | Ramanathan et al. |
| 11,922,220 B2 | 3/2024 | Haghighat et al. |
| 11,936,785 B1 | 3/2024 | Shemesh et al. |
| 2005/0283645 A1 | 12/2005 | Turner et al. |
| 2007/0174915 A1 | 7/2007 | Gribble et al. |
| 2008/0075283 A1 | 3/2008 | Takahashi |
| 2008/0221833 A1 | 9/2008 | Brown et al. |
| 2008/0320594 A1 | 12/2008 | Jiang |
| 2010/0281275 A1 | 11/2010 | Lee et al. |
| 2012/0110651 A1 | 5/2012 | Van Biljon et al. |
| 2013/0024940 A1 | 1/2013 | Hutchins et al. |
| 2013/0124669 A1 | 5/2013 | Anderson et al. |
| 2013/0160119 A1 | 6/2013 | Sartin |
| 2013/0160129 A1 | 6/2013 | Sartin |
| 2013/0290708 A1 | 10/2013 | Diaz et al. |
| 2014/0096134 A1 | 4/2014 | Barak |
| 2014/0237537 A1 | 8/2014 | Manmohan |
| 2014/0317677 A1 | 10/2014 | Vaidya |
| 2014/0337613 A1 | 11/2014 | Martini |
| 2015/0033305 A1 | 1/2015 | Shear |
| 2015/0055647 A1 | 2/2015 | Roberts |
| 2015/0163192 A1 | 6/2015 | Jain |
| 2015/0172321 A1 | 6/2015 | Kirti et al. |
| 2015/0254364 A1 | 9/2015 | Piduri et al. |
| 2015/0304302 A1 | 10/2015 | Zhang et al. |
| 2016/0063466 A1 | 3/2016 | Sheridan et al. |
| 2016/0105454 A1 | 4/2016 | Li |
| 2016/0140352 A1 | 5/2016 | Nickolov |
| 2016/0156664 A1 | 6/2016 | Nagaratnam |
| 2016/0224600 A1 | 8/2016 | Munk |
| 2016/0366185 A1 | 12/2016 | Lee et al. |
| 2017/0026416 A1 | 1/2017 | Carpenter et al. |
| 2017/0070506 A1 | 3/2017 | Reddy |
| 2017/0104755 A1 | 4/2017 | Arregoces |
| 2017/0185784 A1 | 6/2017 | Madou |
| 2017/0187743 A1 | 6/2017 | Madou |
| 2017/0223024 A1 | 8/2017 | Desai |
| 2017/0237560 A1 | 8/2017 | Mueller et al. |
| 2017/0257347 A1 | 9/2017 | Yan |
| 2017/0034198 A1 | 12/2017 | Powers et al. |
| 2018/0004950 A1 | 1/2018 | Gupta et al. |
| 2018/0007087 A1 | 1/2018 | Grady et al. |
| 2018/0026995 A1 | 1/2018 | Dufour et al. |
| 2018/0027009 A1 | 1/2018 | Santos |
| 2018/0063290 A1 | 3/2018 | Yang et al. |
| 2018/0159882 A1 | 6/2018 | Brill |
| 2018/0181310 A1 | 6/2018 | Feinberg et al. |
| 2018/0234459 A1 | 8/2018 | Kung |
| 2018/0239902 A1 | 8/2018 | Godard |
| 2018/0270268 A1 | 9/2018 | Gorodissky et al. |
| 2018/0276084 A1 | 9/2018 | Mitkar et al. |
| 2018/0278639 A1 | 9/2018 | Bernstein et al. |
| 2018/0288129 A1 | 10/2018 | Joshi et al. |
| 2018/0309747 A1 | 10/2018 | Sweet et al. |
| 2018/0321993 A1 | 11/2018 | McClory |
| 2018/0359058 A1 | 12/2018 | Kurian |
| 2018/0359059 A1 | 12/2018 | Kurian |
| 2019/0058722 A1 | 2/2019 | Levin et al. |
| 2019/0068617 A1 | 2/2019 | Coleman |
| 2019/0068627 A1 | 2/2019 | Thampy |

(56) References Cited

U.S. PATENT DOCUMENTS

| | | |
|---|---|---|
| 2019/0104140 A1 | 4/2019 | Gordeychik et al. |
| 2019/0116111 A1 | 4/2019 | Izard et al. |
| 2019/0121986 A1 | 4/2019 | Stopel et al. |
| 2019/0132350 A1 | 5/2019 | Smith et al. |
| 2019/0149604 A1 | 5/2019 | Jahr |
| 2019/0171811 A1 | 6/2019 | Daniel et al. |
| 2019/0191417 A1 | 6/2019 | Baldemair et al. |
| 2019/0207966 A1 | 7/2019 | Vashisht et al. |
| 2019/0220575 A1 | 7/2019 | Boudreau et al. |
| 2019/0245883 A1 | 8/2019 | Gorodissky et al. |
| 2019/0260764 A1 | 8/2019 | Humphrey et al. |
| 2020/0012659 A1 | 1/2020 | Dageville et al. |
| 2020/0028862 A1 | 1/2020 | Lin |
| 2020/0050440 A1 | 2/2020 | Chuppala et al. |
| 2020/0082094 A1 | 3/2020 | McAllister et al. |
| 2020/0125352 A1 | 4/2020 | Kannan |
| 2020/0244678 A1 | 7/2020 | Shua |
| 2020/0259852 A1 | 8/2020 | Wolff et al. |
| 2020/0287927 A1 | 9/2020 | Zadeh et al. |
| 2020/0320845 A1 | 10/2020 | Livny et al. |
| 2020/0336489 A1 | 10/2020 | Wuest et al. |
| 2020/0387357 A1 | 12/2020 | Mathon et al. |
| 2020/0389469 A1 | 12/2020 | Litichever et al. |
| 2021/0026932 A1 | 1/2021 | Boudreau et al. |
| 2021/0089662 A1 | 3/2021 | Muniswamy-Reddy et al. |
| 2021/0105304 A1 | 4/2021 | Kraning et al. |
| 2021/0149788 A1 | 5/2021 | Downie |
| 2021/0158835 A1 | 5/2021 | Hill et al. |
| 2021/0176123 A1 | 6/2021 | Plamondon |
| 2021/0200881 A1 | 7/2021 | Joshi et al. |
| 2021/0203684 A1 | 7/2021 | Maor et al. |
| 2021/0211453 A1 | 7/2021 | Cooney |
| 2021/0216630 A1 | 7/2021 | Karr |
| 2021/0226812 A1 | 7/2021 | Park |
| 2021/0234889 A1 | 7/2021 | Burle et al. |
| 2021/0263802 A1 | 8/2021 | Gottemukkula et al. |
| 2021/0314342 A1 | 10/2021 | Oberg |
| 2021/0320794 A1 | 10/2021 | Auh et al. |
| 2021/0329019 A1 | 10/2021 | Shua et al. |
| 2021/0334386 A1 | 10/2021 | AlGhamdi et al. |
| 2021/0357246 A1 | 11/2021 | Kumar et al. |
| 2021/0368045 A1 | 11/2021 | Verma |
| 2021/0382995 A1 | 12/2021 | Massiglia et al. |
| 2021/0382997 A1 | 12/2021 | Yi et al. |
| 2021/0409486 A1 | 12/2021 | Martinez |
| 2022/0012771 A1 | 1/2022 | Gustafson |
| 2022/0086173 A1 | 3/2022 | Yavo et al. |
| 2022/0131888 A1 | 4/2022 | Kanso |
| 2022/0156396 A1 | 5/2022 | Bednash et al. |
| 2022/0179964 A1 | 6/2022 | Qiao et al. |
| 2022/0182403 A1 | 6/2022 | Mistry |
| 2022/0215101 A1 | 7/2022 | Rioux et al. |
| 2022/0232024 A1 | 7/2022 | Kapoor |
| 2022/0263656 A1 | 8/2022 | Moore |
| 2022/0284362 A1 | 9/2022 | Bellinger et al. |
| 2022/0326861 A1 | 10/2022 | Shachar et al. |
| 2022/0327119 A1* | 10/2022 | Gasper ................ G06F 16/2428 |
| 2022/0342690 A1 | 10/2022 | Shua |
| 2022/0345481 A1 | 10/2022 | Shua |
| 2022/0350931 A1 | 11/2022 | Shua |
| 2022/0357992 A1 | 11/2022 | Karpovsky |
| 2022/0400128 A1 | 12/2022 | Kfir et al. |
| 2022/0407841 A1 | 12/2022 | Karpowicz |
| 2022/0407889 A1 | 12/2022 | Narigapalli et al. |
| 2022/0414103 A1 | 12/2022 | Upadhyay et al. |
| 2022/0417011 A1 | 12/2022 | Shua |
| 2022/0417219 A1 | 12/2022 | Sheriff |
| 2023/0007014 A1 | 1/2023 | Narayan |
| 2023/0040635 A1 | 2/2023 | Narayan |
| 2023/0075355 A1 | 3/2023 | Twigg |
| 2023/0087093 A1* | 3/2023 | Ithal ..................... G06F 21/577 726/7 |
| 2023/0093527 A1 | 3/2023 | Shua |
| 2023/0110080 A1 | 4/2023 | Hen |
| 2023/0125134 A1 | 4/2023 | Raleigh et al. |
| 2023/0134674 A1 | 5/2023 | Quinn et al. |
| 2023/0136839 A1 | 5/2023 | Sundararajan et al. |
| 2023/0164148 A1 | 5/2023 | Narayan |
| 2023/0192418 A1 | 6/2023 | Horowitz et al. |
| 2023/0208870 A1 | 6/2023 | Yellapragada et al. |
| 2023/0231867 A1 | 7/2023 | Rampura Venkatachar |
| 2023/0237068 A1 | 7/2023 | Sillifant et al. |
| 2023/0254330 A1 | 8/2023 | Singh |
| 2023/0325814 A1 | 10/2023 | Vijayan et al. |
| 2023/0336578 A1 | 10/2023 | Lidgi et al. |
| 2023/0376586 A1 | 11/2023 | Shemesh et al. |
| 2024/0007492 A1 | 1/2024 | Shen et al. |
| 2024/0037229 A1 | 2/2024 | Pabon et al. |
| 2024/0080329 A1 | 3/2024 | Reed et al. |
| 2024/0080332 A1 | 3/2024 | Ganesh et al. |

OTHER PUBLICATIONS

Christos Kyrkou; Towards artificial-intelligence-based cybersecurity for robustifying automated driving systems against camera sensor attacks; IEEE 2020; pp. 476-481.

Guo, yu et al. Enabling Encrypted Rich Queries in Distributed Key-Value Stores. IEEE Transactions on Parallel and Distributed Systems, vol. 30, Issue: 6. https://ieeexplore.ieee.org/stamp/stamp.jsp?tp=&arnumber=8567979 (Year: 2019).

Henry Hanping Feng; Anomaly Detection Using Call Stack Information; IEEE: Year:2003; pp. 1-14.

International Search Report for PCT Application No. PCT/IB2022/060940 dated Feb. 1, 2023. The International Bureau of WIPO.

International Search Report for PCT/IB2023/050848, dated May 9, 2023. International Bureau of WIPO.

International Search Report of PCT/IB2023/058074, dated Nov. 20, 2023. Searching Authority United States Patent and Trademark Office, Alexandria, Virginia.

International Search Report, PCT/IB23/55312. ISA/US, Commissioner for Patents, Alexandria, Virginia. Dated Aug. 30, 2023.

Kumar, Anuj et al. A New Approach for Security in Cloud Data Storage for IOT Applications Using Hybrid Cryptography Technique. 2020 International Conference on Power Electronics & IoT Applications in Renewable Energy and its Control. https://ieeexplore.ieee.org/stamp/stamp.jsp?tp=&arnumber=9087010 (Year: 2020).

Microsoft Build. "Introductions to Azure managed disks". Aug. 21, 2023, https://docs.microsoft.come//en-us/azure/virtual-machines/managed-disks-overview.

Microsoft Docs. "Create a VM from a managed image". Article. Jan. 5, 2022. https://docs.microsoft.come/en-us/azure/virtual-machines/windows/create-vm-generalized-managed.

Mishra, Bharati; Jena, Debasish et al. Securing Files in the Cloud. 2016 IEEE International Conference on Cloud Computing in Emerging Markets (CCEM). https://ieeexplore.ieee.org/stamp/stamp.jsp?tp=&arnumber=7819669 (Year: 2016).

Shuvo, Arfatul Mowla et al. Storage Efficient Data Security Model for Distributed Cloud Storage. 2020 IEEE 8th R10 Humanitarian Technology Conference (R10-HTC). https://ieeexplore.ieee.org/stamp/stamp/jsp?tp=&arnumber=9356962 (Year: 2020).

Written Opinion of the International Searching Authority for PCT Application No. PCT/IB2022/060940 dated Feb. 1 2023. The International Bureau of WIPO.

Written Opinion of the International Searching Authority for PCT/IB23/55312. ISA/US Commisioner for Patents, Alexandria, Virginia. Dated Aug. 30, 2023.

Written Opinion of the Searching Authority for PCT/IB2023/050848, dated My 9, 2023. International Bureau of WIPO.

Written Opinion of the Searching Authority of PCT/IB2023/058074, dated Nov. 20, 2023. Searching Authority United States Patent and Trademark Office, Alexandria, Virginia.

Zhang et al. BMC Bioinformatics 2014. "On finding bicliques in bipartite graphs: a novel algorithm and its application to the integration of diverse biological data types". http://biomedcentral.com/1471-2105/15/110.

(56) References Cited

OTHER PUBLICATIONS

Sahil Suneja; Safe Inspection of Live Virtual Machines; IEEE; Year 2017; pp. 97-111.

* cited by examiner

SYSTEM AND METHOD FOR AGENTLESS DETECTION OF SENSITIVE DATA IN COMPUTING ENVIRONMENTS

CROSS-REFERENCE TO RELATED APPLICATIONS

This application claims the benefit of U.S. Provisional Application No. 63/377,403 filed on Sep. 28, 2022, the contents of which are hereby incorporated by reference.

TECHNICAL FIELD

The present disclosure relates generally to cybersecurity, and specifically to detecting sensitive data in a computing environment which is potentially exposed, and alerting of the same.

BACKGROUND

Many advantages of modern life are possible thanks to solutions provided by various computer related industries. Travel relies on booking software, cross-country and cross-continent accounting is possible due to software solutions, e-commerce allows people to organize a worldwide marketplace to purchase goods and services from anywhere to anywhere, while even national infrastructure such as water, gas, and electricity, are connected to computer networks to efficiently manage the provision of utilities.

Many of these software solutions are deployed on cloud computing infrastructure, such as provided by Amazon® Web Services (AWS), Google® Cloud Platform (GCP), Microsoft® Azure, and the like. Some software solutions are deployed on premises (on-prem), others are deployed using hybrid cloud solutions, while others are deployed on multi-cloud platforms. This allows users and administrators of such solutions to leverage each platform's advantages. However, as these software solutions grow, i.e., provide more services, and more service types, to more users, deployment of such solutions becomes cumbersome. It is not unusual for cloud computing environments deployed on a cloud computing platform to have thousands, and tens of thousands of virtual instances, such as virtual machines, serverless functions, software containers, and the like, utilized to provide the software solution.

Some of these software solutions store sensitive data, such as credit card numbers, social security numbers, physical addresses of individuals, medical data, and more. Sensitive data can be classified as personal identifiable information (PII), personal health information (PHI), and payment card industry (PCI), to name a few examples. While rules and regulations exist to monitor use and storage of such data, such are usually jurisdiction-specific, and only add to the complexity of the software solutions which need to perform this monitoring in order to comply with the various rules and regulations.

While there are solutions which allow visibility into network elements, including types of virtual instances, services, data storages, and the like, such solutions provide an abundance of information which a human is not able to process. For example, where an administrator wishes to find a certain network element, it is not useful to show an abundance of network elements which the administrator then has to sift through. Such solutions are provide frustrating user experience, and as a result their usability, i.e., the number of interactions between a human operator and a computing system, drops significantly.

It is beneficial to provide a visualization of where sensitive data is stored and potentially exposed, as humans rely on our sense of vision more than other senses. However, over stimulating this sense results in the human operator ceasing to use the network visibility solution, and therefore leaving sensitive data potentially exposed to cybersecurity attacks.

Furthermore, an administrator does not always necessarily know where sensitive data is stored, as the data may be handled by different users, virtual instances, and the like, across multiple cloud environments. Therefore, marking a certain storage as containing sensitive data and monitoring access to said storage, is insufficient, due to the dynamic nature of cloud computing environments and their usage.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for agentless detection of sensitive data in a cloud computing environment and rendering the same for display. The method comprises: detecting a first data object in a cloud computing environment, the first data object including a data schema and a content; detecting a second data object, the second data object having the data schema of the first data object; generating in a security graph hosted on a graph database: a first data object node representing the first data object, a second data object node representing the second data object, and a data schema node representing the data schema, wherein the security graph further includes a representation of the cloud computing environment; storing a classification based on the content in the security graph, wherein the content is classified as sensitive data or non-sensitive data; and rendering an output based on the classification and the data schema node, in lieu of the first data object node and the second data object node, in response to receiving a query to detect a node representing a data object classified as sensitive data.

Certain embodiments disclosed herein also include a non-transitory computer readable medium having stored thereon causing a processing circuitry to execute a process, the process comprising: detecting a first data object in a cloud computing environment, the first data object including a data schema and a content; detecting a second data object, the second data object having the data schema of the first data object; generating in a security graph hosted on a graph database: a first data object node representing the first data object, a second data object node representing the second data object, and a data schema node representing the data schema, wherein the security graph further includes a representation of the cloud computing environment; storing a classification based on the content in the security graph, wherein the content is classified as sensitive data or non-sensitive data; and rendering an output based on the classification and the data schema node, in lieu of the first data object node and the second data object node, in response to receiving a query to detect a node representing a data object classified as sensitive data.

Certain embodiments disclosed herein also include a system for agentless detection of sensitive data in a cloud computing environment and rendering the same for display. The system comprises: a processing circuitry; and a memory, the memory containing instructions that, when executed by the processing circuitry, configure the system to: detect a first data object in a cloud computing environment, the first data object including a data schema and a content; detect a second data object, the second data object having the data schema of the first data object; generate in a security graph hosted on a graph database: a first data object node representing the first data object, a second data object node representing the second data object, and a data schema node representing the data schema, wherein the security graph further includes a representation of the cloud computing environment; store a classification based on the content in the security graph, wherein the content is classified as sensitive data or non-sensitive data; and render an output based on the classification and the data schema node, in lieu of the first data object node and the second data object node, in response to receiving a query to detect a node representing a data object classified as sensitive data.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for agentless detection of sensitive data in computing environments. In an embodiment, a computing environment is implemented on a cloud computing platform, such as Amazon® Web Services (AWS), Google® Cloud Platform (GCP), Microsoft® Azure, and the like. The computing environment is implemented, in an embodiment, as a virtual private cloud (VPC) on AWS, as a virtual network (VNet) on Azure, and the like. Sensitive data is, in an embodiment, personal identifiable information (PII), personal health information (PHI), and payment card industry (PCI). Sensitive data may be spread across multiple files, multiple different cloud computing environments, and across different workloads (e.g., storage buckets). In some embodiments, a data file is accessed to extract metadata, a data schema, a combination thereof, and the like of that file.

For example, an Apache® Parquet file is a column-oriented storage file for database tables, which has a header indicating the data schema used when generating the file. A data schema includes rules according to which data is written to a database, providing a structure for storing the data. For example, the schema of a columnar-oriented database includes the name of each column of each table of the database. In an embodiment a node is generated in a security graph to represent the data schema. In certain embodiments the security graph is stored on a graph database, such as Neo4j®, and includes a representation of a cloud computing environment.

Cloud entities of the cloud computing environment may be represented as nodes in the security graph. A cloud entity is, in an embodiment, a resource, a principal, an the like. A resource is a cloud entity which provides a service, access to computer hardware, or a combination thereof, and may be, for example, a virtual machine, a software container, a serverless function, an application, an appliance, a web server, a gateway, a load balancer, a storage bucket, and the like.

In an embodiment, a principal is a cloud entity which is authorized to initiate an action in the cloud computing environment, act on a resource, a combination thereof, and the like. A principal may be, for example, a user account, a service account, a role, and the like.

In some embodiments, a check is performed to determine if the detected data schema matches a cluster. A cluster is a node which represents a plurality of data files, to indicate that the plurality of data files represents a single data entity. For example, a columnar database may be stored as a plurality of parquet files, each file a part of the whole. When viewed as network elements, each file is separate, but since they share a data schema, the files can be associated with a cluster, which represents the database as a whole.

In certain embodiments, the data is further classified to ascertain what type of data is stored in the data file. In some embodiments, data is classified into sensitive data and non-sensitive data. In certain embodiments, sensitive data is further classified into PII, PHI, PCI, and the like. Classification is performed, in an embodiment, by reading the data and comparing the data to predetermined formats. For example, data may be read from a file, and compared with a predetermined data format. Comparing may include, in an embodiment, parsing the data to search for specific characters. For example, data may be parsed to detect an "@" symbol, which indicates that the data is an email address. In some embodiments, the comparison includes detecting metadata to reduce a number of predetermined data formats.

For example, if metadata of a column indicates "address", the predetermined data formats may be email address, physical address, and IP address. In an embodiment a predetermined data format includes a rule which is applied to the read data to determine what the data is. For example, applying a rule may include an instruction to search the data for an "@" symbol, search the data for a series of four numbers separated by a ".", search the data for "RD", "AVE", BLVD", "LN", and the like, each of which is indicative of a different type of address.

In an embodiment, a visualization is generated based on the generated cluster node. In certain embodiments, the visualization is generated in response to receiving a request from a user account, administrator account, and the like, to view where sensitive data is stored. In some embodiments, the security graph may be queried to detect sensitive data and an output of the query is used to generate the visualization. For example, the security graph is queried to detect sensitive data of PII type. In an embodiment the output includes a plurality of nodes, each representing a data file. In some embodiments the output may be further modified by querying the security graph to detect a cluster node connected to the plurality of nodes.

By generating a visualization based on the cluster node to indicate the presence of a sensitive data in the computing environment, there is no need to render a plurality of nodes, each representing the data files associated with the cluster. Therefore, compute resources are conserved, by reducing the amount of information which needs to be rendered for display. In some embodiments, the output is further modified to detect a node representing a resource associated with the data file. A resource associated with the data file may be, for example, a storage bucket. As another example, a resource may be a virtual machine on which a database management system (DBMS) is deployed which writes the data file, for example to a storage bucket, or other data repository.

In certain embodiments, the generated visualization allows reduction of repetitive user interactions with the visualization. For example, generating an interactive visualization allows a user to click on a visualization representing, for example, a data file, and rendering in response to the interaction additional information about the data file. The additional information may include, for example, the data schema. The user may repeat this for each data file, to determine which data files comprise together a single database, such as in the example of the parquet files discussed above. By displaying a cluster node as part of the rendered visualization, this repetitive interaction is reduced. Each such interaction is a form of querying, and by reducing these queries, less processor and memory resources need to be utilized, thereby providing an additional benefit.

Figure 1:
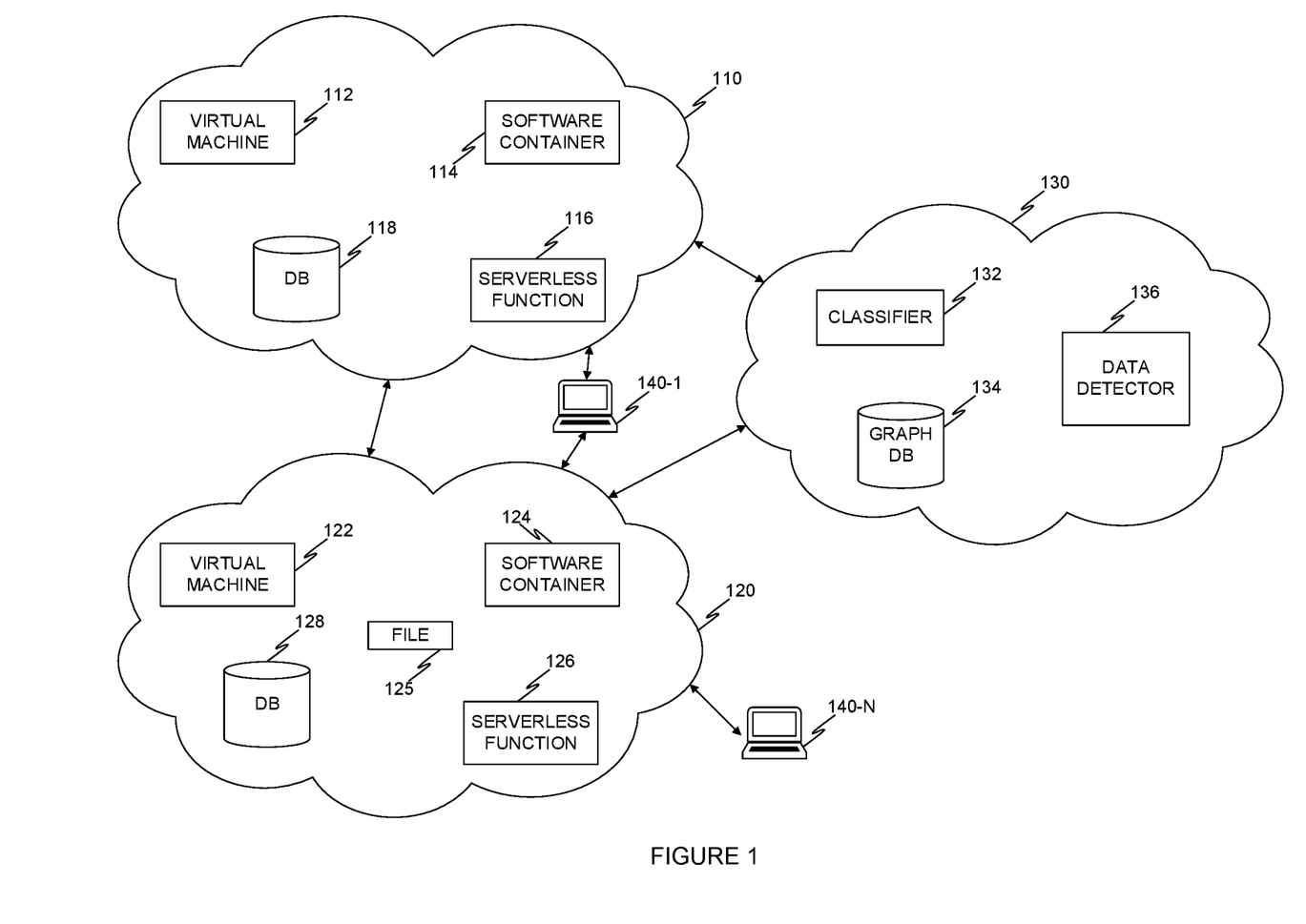
FIG. 1 is a network diagram including a cloud computing environment and an inspection environment, implemented in accordance with an embodiment.

FIG. 1 is an example of a network diagram including a cloud computing environment and an inspection environment, implemented in accordance with an embodiment. A production cloud computing environment 110 includes a plurality of resources, principals, and the like. Resources may be, for example, virtual instances such as virtual machine 112, software container 114, and serverless function 116. Resources may be, as another example, applications, such as database application 118. A virtual machine 112 may be implemented for example as an Oracle® VirtualBox®. A software container 114 may be implemented, for example, utilizing a Docker® engine, a Kubernetes® engine, and the like. A serverless function 116 may be implemented, for example, as an Amazon® Lambda function.

In an embodiment, the database 118 includes structured data, unstructured data, a combination thereof, and the like. Structured data may be, for example, a SQL database, a NoSQL database, and the like. A SQL database may be, for example, a MySQL® database, a MongoDB® database, a Redis® database, and the like. A NoSQL database may be, for example, an Apache® Ignite database, an Apache Girpah database, a Neo4j® database, an Amazon DynamoDB database, an Azure Cosmos DB database, a Google Cloud Datastore, and the like. Unstructured data may be, for example files, folders, and the like, such as JSON files, XML files, and the like.

A production cloud computing environment 110, also referred to as "production environment 110" and "cloud computing environment 110", is a cloud computing environment where user-ready software is deployed and executed. Software development often includes a development environment, a testing environment, a staging environment, and a production environment. This allows software engineers to ensure that code performs as expected, appliances, virtualizations, and the like, all perform according to set expectations, prior to being deployed in a production environment. This is done in order to prevent obstruction in the production environment, for example by introducing malfunctioning code. In an embodiment, the production environment 110 is implemented using a VPC on a cloud computing platform such as AWS. In some embodiments, the production environment 110 includes a plurality of cloud computing environments, each implemented on a different cloud computing platform. For example, the production environment 110 includes, in an embodiment, a first cloud computing environment implemented on AWS and a second cloud computing environment implemented on GCP.

The production environment 110 is communicatively coupled with a development cloud computing environment 120, also referred to as dev environment 120 and cloud computing environment 120. In an embodiment, the dev environment 120 is implemented utilizing a VPC on a cloud computing platform such as AWS. In some embodiments, the dev environment 120 includes a plurality of cloud computing environments, each implemented on a different cloud computing platform. For example, the dev environment 120 includes, in an embodiment, a first cloud computing environment implemented on GCP and a second cloud computing environment implemented on AWS.

The dev environment 120 includes a virtual machine 122 which is a counterpart to the virtual machine 112 of the production environment 110, a software container 124 which is a counterpart to the software container 114 of the production environment 110, a serverless function 126 which is a counterpart to the serverless function 116 of the production environment 110, a database 128 which is a counterpart to the database 118 of the production environment 110, and a data file 125.

In an embodiment, the data file 125 is a structured data file, such as an Apache® Parquet file, an Apache ORC file, an Apache Avro file, and the like. In some embodiments, the data file 125 includes a data schema, metadata, a combination thereof, and the like. For example, a data schema, metadata, and the like, can be stored in a header (not shown) of the data file 125.

The dev environment 120 is accessible, for example through an external network (not shown) which provides access to user devices 140-1 through 140-N, individually referred to as user device 140 and generally as user devices 140, where 'N' is an integer having a value of '1' or more. A user account associated with a user device 140 may initiate actions in the dev environment 120. For example, the user account may initiate deployment of a virtual machine, initiate the generation of the file 125 (for example by downloading a file from a database and storing it in the dev environment 120), and the like. In an embodiment, a user device is any one of: a laptop, a personal computer, a server, a tablet, and the like.

Certain user accounts and user devices 140, such as user device 140-1 are configured to access the production environment 110 and the dev environment 120. This may lead to contamination of the dev environment 120, for example by a user transferring files from the production environment 110 to the dev environment 120. For example, a user of user device 140-1 may generate a file by accessing a bucket into which database 118 writes sensitive data, such as PII. The user device 140-1 downloads the file to the user device, which may occur for example during testing. Downloading files is often permissible as such files can be utilized for testing purposes (e.g., checking that code processes information correctly), but the files are then not deleted. A user may then inadvertently copy the sensitive data, for example as file 125, to the dev environment 120. A dev environment 120 may have less cybersecurity restrictions in place, which can lead to larger unintentional exposure of sensitive data.

The dev environment 120 and production environment 110 are communicatively coupled with an inspection environment 130. In certain embodiments, the inspection environment 130 is deployed as cloud computing environment on a cloud computing platform, such as a VNet on Azure. In an embodiment, the inspection environment 130 includes a classifier 132, a graph database 134, and a data detector 136.

A classifier 132 is implemented, in an embodiment, as a workload in a cloud computing environment, such as a virtual machine, software container, serverless function, a combination thereof, and the like. In certain embodiments, the classifier 132 is configured to read data, for example from data file 125, and perform classification on the data to determine if the data is sensitive data or non-sensitive data. In certain embodiments, the classifier 132 is configured to determine if the sensitive data is any one of: PII, PHI, PCI, a combination thereof, and the like.

In an embodiment a classifier 132 is configured to utilize various classification techniques, individually or in combination, such as linear classifiers, quadratic classifiers, decision trees, neural networks, machine learning, and the like. In some embodiments, the classifier 132 is configured to perform natural language processing (NLP) techniques on data, such as Word2Vec. This may be beneficial to determine a distance between, for example, a column name (such as "ccard") and a predefined term (such as "credit card"), where the predefined term is associated with a data type.

For example, the classifier 132 is configured, in an embodiment, to read a data file, read metadata stored in the data file, and read a data schema stored in the data file. In an embodiment the classifier 132 is further configured to perform classification, NLP, a combination thereof, and the like, on any one of: the data, the metadata, and the data schema.

A graph database 134 is configured to store thereon a security graph. An example of a security graph is discussed in more detail in FIG. 4 below. In an embodiment, a security graph includes a representation of a cloud computing environment, such as the production environment 110, the dev environment 120, a combination thereof, and the like. The security graph includes a plurality of nodes. In an embodiment, a node represents a resource, a principal, an enrichment, and the like. For example, the virtual machine 112 may be represented by a first node in the security graph, and the corresponding virtual machine 122 may be represented by a second node in the security graph, which is connected, for example by an edge, to the first node, to indicate that the virtual machine 122 corresponds to the virtual machine 112.

In certain embodiments, a cloud computing environment is represented in the security graph based on a predefined data schema. For example, a data structure may be predefined for a resource, and another data structure may be predefined for a principal. In some embodiments, the predefined data structure for a resource includes a data field which indicates if the resource has stored thereon, has access to, or may otherwise obtain, sensitive data. The data field is implemented, in an embodiment, as a flag, having binary options.

In some embodiments, a data detector 136 is configured to receive a plurality of data files, and determine for example based on an extracted data schema, if the data files are associated with a single data schema. In an embodiment, the data detector 136 is configured to extract a data schema from a data file 125. For example, a data schema of a parquet file may be read by accessing the parquet file and reading the header. In certain embodiments, the data detector 136 is configured to generate an instruction, which when executed by the graph database 134, configures the graph database 134 to generate a node in the security graph which represents a data cluster. A data cluster as used herein refers to a plurality of data objects, such as data files, which are all based on a single data schema. In certain embodiments, the instruction, when executed, further configures the graph database 134 to generate a connection, for example via an edge, between the node representing the data cluster, and a node representing a data file which has a schema corresponding to the data cluster. In certain embodiment, the instruction may further configure the graph database 134 to generate a node representing the data schema.

While a production environment 110 and a dev environment 120 are discussed in this embodiment, it is readily apparent that the teachings herein apply to other environments utilized for software deployment, such as staging environments and testing environments.

Figure 2:
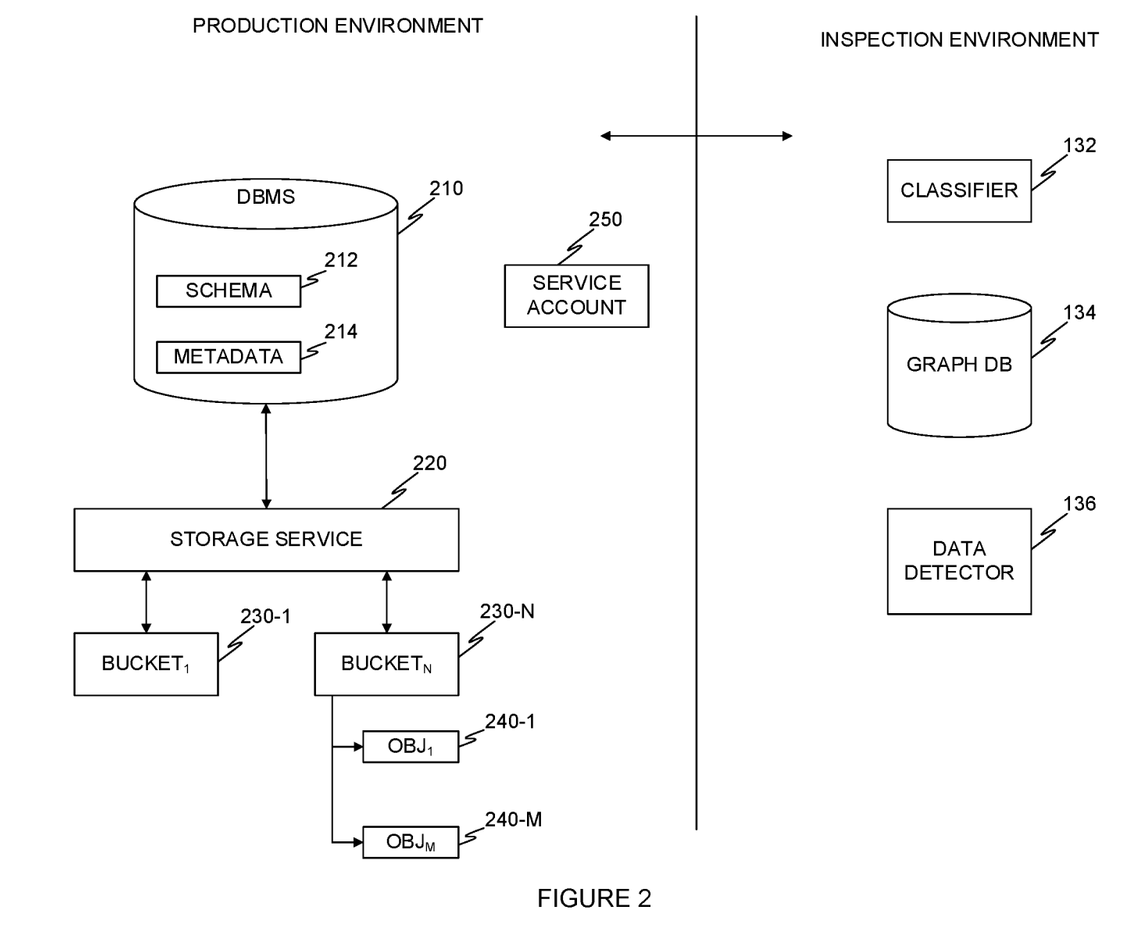
FIG. 2 is a schematic illustration of a database inspected by an inspection environment, utilized to describe an embodiment.

FIG. 2 is an example of a schematic illustration of a database inspected by an inspection environment, utilized to describe an embodiment. A database 210 is deployed in a production environment, such as the production environment 110 of FIG. 1 above. In an embodiment the database 210 is a MySQL database. The database 210 includes a database management system (DBMS) application, a data schema 212, and metadata 214. In an embodiment, the data schema 212 includes a rule which is applied to data received by the database 210 and based upon which the DBMS commits the data to the database.

In an embodiment, a DBMS is configured to commit data to a database 210 by accessing a storage service 220. In certain embodiments a storage service 220 is, for example, Amazon® Simple Storage Service (S3). In an embodiment a storage service 220 utilizes an object storage. For example, the storage service 220 includes, in an embodiment, a plurality of buckets 230-1 through 230-M, individually referenced as storage bucket 230 (or bucket 230), generally referenced as storage buckets 230 (or buckets 230), where 'M' is an integer having a value of '2' or greater. In an embodiment, a bucket 230 is an object container. Data is written as objects to the object container, such that each object has a unique identifier of the object in the object container (i.e., bucket).

In certain embodiments, data is written by the DBMS utilizing the storage service 220 to a bucket 230-N. In some embodiments, the data is written in batches, each batch including a data object. For example, the bucket 230-N includes a plurality of data objects 240-1 through 240-M, individually referenced as data object 240, generally referenced as data objects 240, where 'M' is an integer having a value of '2' or greater. For example a first data object 240-1 may correspond to the data file 125 of FIG. 1 above.

In some embodiments, the production environment includes a service account 250. The service account 250 is a principal which is configured to access the production environment for inspection purposes, and receives instructions from the inspection environment, for example from the data detector 136. In an embodiment, a data detector 136 generates an instruction which, when executed by the service account 250, configures the service account 250 to access the storage service 220 and retrieve therefrom a data object 240. In some embodiments, the service account 250 is configured to send the data object to the inspection environment, for example to be accessed by the data detector 136, the classifier 132, and the like. In certain embodiments, the service account 250 is configured to receive an instruction from the data detector 136, which when executed configures the service account to access the data object and extract data, a data schema, metadata, combinations thereof, and the like, and send the extracted data, extracted data schema, extracted metadata, and the like to the inspection environment to be accessed, for example, by the data detector 136.

Figure 3:
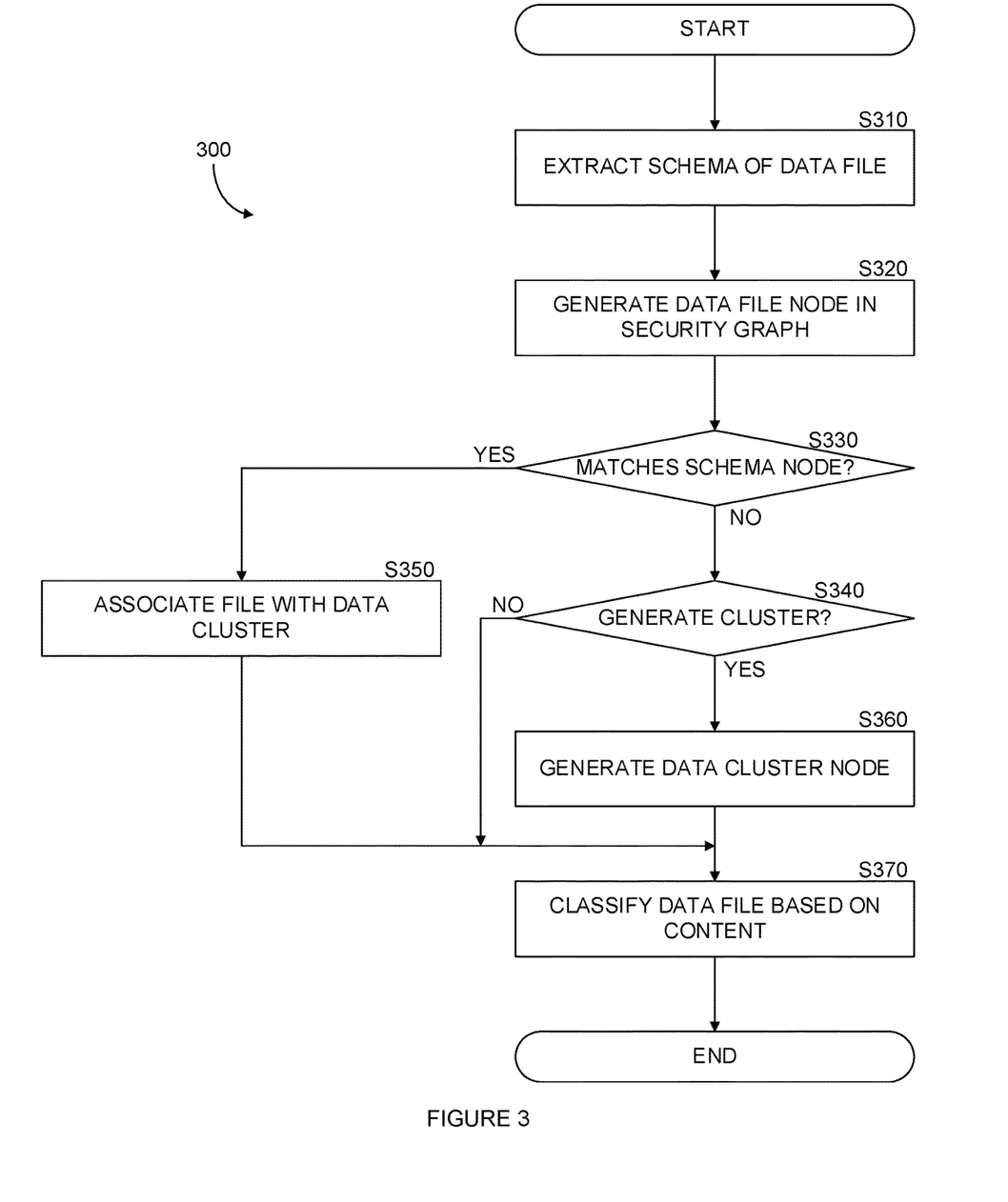
FIG. 3 is a flowchart of a method for clustering data objects on a security graph, implemented in accordance with an embodiment.

FIG. 3 is an example flowchart of a method for clustering data objects on a security graph, implemented in accordance with an embodiment. A data cluster represents a plurality of data objects, such as data files, which are all generated based on a single, same, schema.

At S310, a data schema of a data file is extracted. In an embodiment, extracting a data schema from a data file includes reading the data file and searching the data file for a header indicating the data schema. In an embodiment, a data schema includes a plurality of integrity constraints imposed on a database, or a file which stores a part of a database, in case of a distributed database. For example, in a relational database, a data schema includes, in an embodiment, a table name, a first column name, a first column data type, a second name, a second column data type, etc. In an embodiment, the data file is any one of: an Apache® Parquet file, an Apache ORC™ file, an Apache Avro™ file, and the like. For example, an Avro file includes a file header, which is followed by a plurality of data blocks. The file header includes metadata, which includes a data schema. A data schema in an Avro file is defined using JSON markup language. In an embodiment, the data fields of the JSON are read, and the values of the data fields extracted to identify the data schema.

In an embodiment, the data file is deployed in a cloud computing environment, such as production environment, a dev environment, a test environment, a staging environment, and the like. For example, the data file may be a data object stored in a bucket on an S3 service. The data file is generated, in an embodiment, by a database application, based on a data schema.

At S320, a data file node is generated in a security graph. In an embodiment, a data file node corresponds to the data file from which the data schema is extracted. In some embodiments, a data file node includes information about the data file, such as an identifier of the data file (e.g., file name), an identifier of a storage container from which the data file is extracted, an identifier of a workload on which the data file is stored, and the like. A storage container may be implemented, for example, utilizing Amazon® S3. A workload may be, for example, a virtual machine, a software container, a serverless function, and the like. For example, a data file may be detected on a disk associated with a virtual machine. Detection of the data file on a disk of the virtual machine may occur, for example, during inspection of the disk, for example for cybersecurity objects.

In an embodiment, the security graph includes a representation of a cloud environment in which the data file is deployed. For example, a virtual machine, software container, and serverless function may each be represented by a respective resource node in the security graph. An example of a security graph is discussed in more detail in FIG. 4 below.

At S330, a check is performed to determine if the extracted data schema matches a data schema stored on the security graph. If 'yes' execution continues at S350. If 'no', execution continues at S340. In an embodiment, the check is performed to determine if a node representing the data schema is already stored in the security graph. In some embodiments, a security graph is queried, for example based on data values extracted from a header of a data file indicating a data schema, to detect a node having the data values stored thereon.

At S340, a check is performed to determine if a data cluster node should be generated. If 'yes' execution continues at S360. If 'no' execution continues at S370. In an embodiment, a data file is associated with a data cluster node (also referred to as cluster node), for example by generating a node representing the data file, generating a node representing a data cluster, and connecting the node representing the data file to the data cluster node with an edge. Data files which are represented by nodes are indicated as being part of a single data structure, such as a distributed database, by connecting each such node to a data cluster node.

In some embodiments, data file nodes are connected to a cluster node of a single cloud computing environment. For example, a data file node representing a data file residing in a production environment and generated based on a first data schema is connected to a data cluster node of the production environment, while a data file node based on the first data schema but residing in a dev environment is connected to a data cluster node of the dev environment.

In certain embodiments, a data schema node is generated in the security graph to represent a data schema. In an embodiment, the schema node is generated based on the extracted data schema. In certain embodiments, the schema node includes metadata, such as an identifier of the schema, extracted values from data fields of the data schema, and the like. The data schema node may be connected by an edge, in an embodiment, to a data cluster node, a data file node, and the like.

At S350, the node representing the data file is associated with a node representing the data cluster. In an embodiment, associating the node representing the data file with a node representing the data cluster incudes generating an edge between the nodes and storing the edge in the security graph. By associating a plurality of data files with a node representing a data cluster, the data cluster may be displayed when rendering a visualization of sensitive data in a cloud computing environment. This reduces the amount of elements rendered, which is a reduction in processing and memory utilization.

At S360, a data cluster node is generated. In an embodiment, the data cluster node includes stored thereon metadata, such as a type of data. In some embodiments, the data cluster node is connected to a node which represents a storage in which a data file, represented by a node connected to the data cluster node, is stored. In an embodiment, the storage is a bucket. In certain embodiments a data schema node is generated for each generated data cluster node. In an embodiment, the schema node is generated based on the extracted data schema. In certain embodiments, the schema node includes metadata, such as an identifier of the schema, extracted values from data fields of the data schema, and the like.

At S370, the data file is classified. In an embodiment, the data file is classified based on the content of the data file. In some embodiments, classification of data is performed by reading the content of the data file and providing the content to a data classifier. In certain embodiments, classifying the data file includes generating an instruction which when executed provides a data classifier access to the data file, content of the data file, metadata of the data file, the data schema, a combination thereof, and the like.

In an embodiment, the data file is classified to sensitive data or non-sensitive data. In some embodiments, sensitive data is classified into PII, PHI, PCI, a combination thereof, and the like. In certain embodiments classifying the data file includes performing classification techniques, performed individually or in combination, such as linear classification, quadratic classification, decision trees, neural networks, machine learning, and the like. In some embodiments, natural language processing (NLP) techniques, such as Word2Vec, are performed on the data. This may be beneficial to determine a distance between, for example, a column name (such as "ccard") and a predefined term (such as "credit card"), where the predefined term is associated with a data type.

For example, in an embodiment, the data file is read, metadata stored in the data file is read, and a data schema stored in the data file is read. Data classification, NLP, a combination thereof, and the like, is then performed on any one of the read: data, metadata, and data schema.

Figure 4:
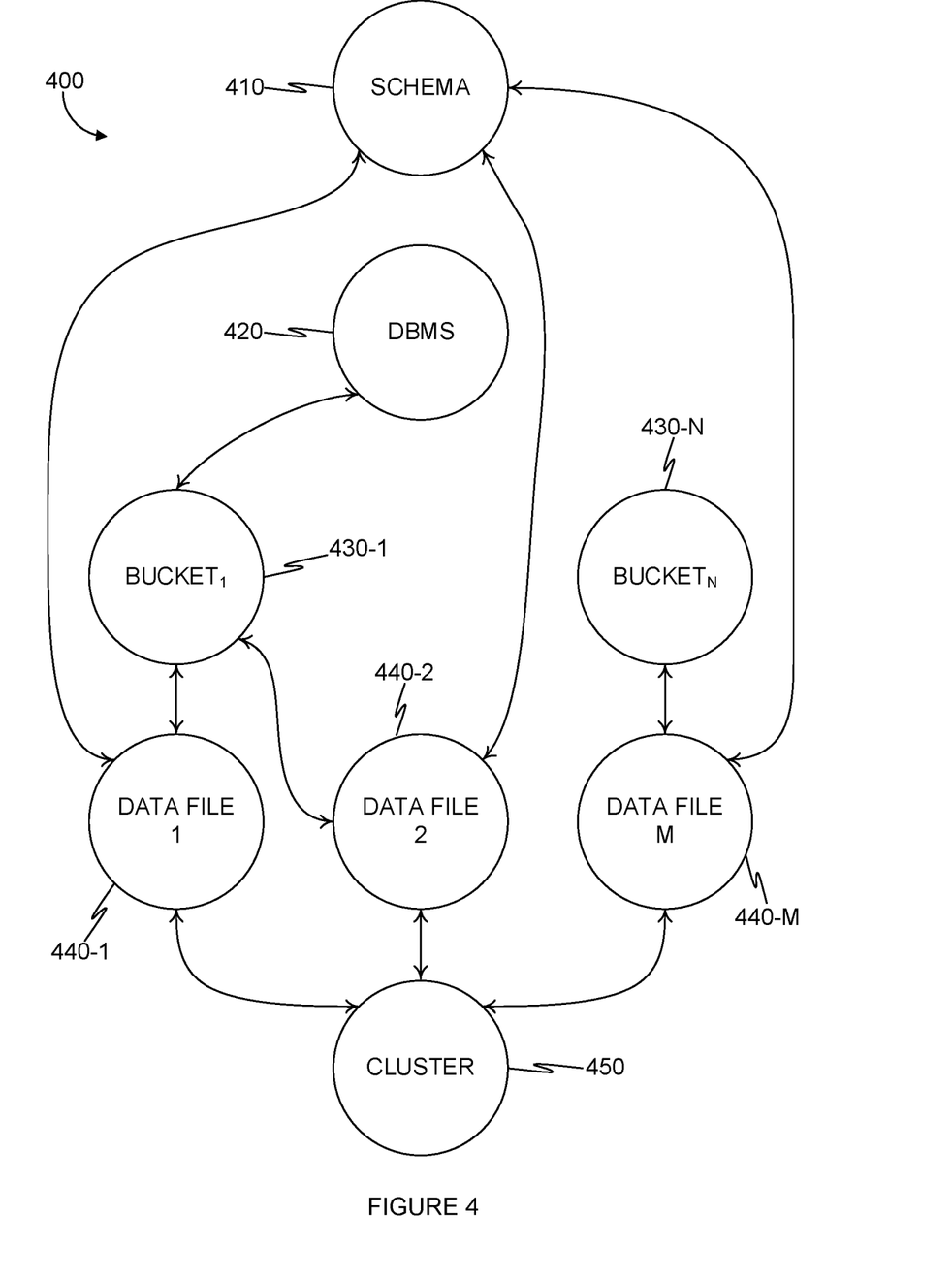
FIG. 4 is a security graph representing a portion of a cloud computing environment, implemented in accordance with an embodiment.

FIG. 4 is an example graph 400 of a security graph representing a portion of a cloud computing environment, implemented in accordance with an embodiment. A data schema node 410 is connected to a first data file node 440-1, a second data file node 440-2 and a third data file node 440-M. Each data file node 440-1 through 440-M, where 'M' is an integer having a value of '3' or greater, represents a data file which shares a schema, the schema represented by the data schema node 410.

Each data file node 440-1 through 440-M is connected to a bucket node 430-1 through 430-N, where 'N' is an integer having a value of '2' or greater, each bucket node representing a bucket in a cloud computing environment. In an embodiment, the first bucket represented by the first bucket node 430-1 is deployed in a first cloud computing environment and the second bucket, represented by the second bucket node 430-N, is deployed in a second cloud computing environment, which is different from the first cloud computing environment. For example, the first cloud computing environment may be deployed on AWS, while the second cloud computing environment is deployed on GCP.

The first bucket node 430-1 is connected to the first data file node 440-1 and the second data file node 440-2. The second bucket node 430-N is connected to the third data file node 440-M. In an embodiment, a DBMS application, such as deployed on database 210 of FIG. 2 writes data files to the first bucket. The DBMS application is represented by a DBMS node 420.

In an embodiment, the first data file node 440-1, the second data file node 440-2 and the third data file node 440-M are each connected to a data cluster node 450. In certain embodiments, the third data file node 440-M is not connected to the cluster node 450, in response to determining that the third data file is deployed in a cloud computing environment which is not the cloud computing environment in which the first data file and the second data file are deployed.

In certain embodiments, a security graph 400 is queried to detect sensitive data nodes. For example, a query may be executed on a graph database, such as Neo4j®, in which a security graph 400 is stored. The query, when executed, returns as an output nodes which include metadata indicating that the node represents a sensitive data element. For example, a classifier may determine that the first data file represented by the first data file node 440-1 includes sensitive data. The first data file node 440-1 is updated with a value, for example stored as metadata, to indicate that the first data file represented by the first data file node 440-1 includes sensitive data.

In some embodiments, the security graph 400 is further traversed, to determine if a data file node is connected to a cluster node. If the data file node is connected to a data cluster node, such as data cluster node 450, the data cluster node 450 may be provided as an output to the query, in lieu of providing the first data file node 440-1, the second data file node 440-2, and the third data file node 440-M, each of which include thereon sensitive data, as indicated, for example, by a metadata value stored thereon.

Figure 5:
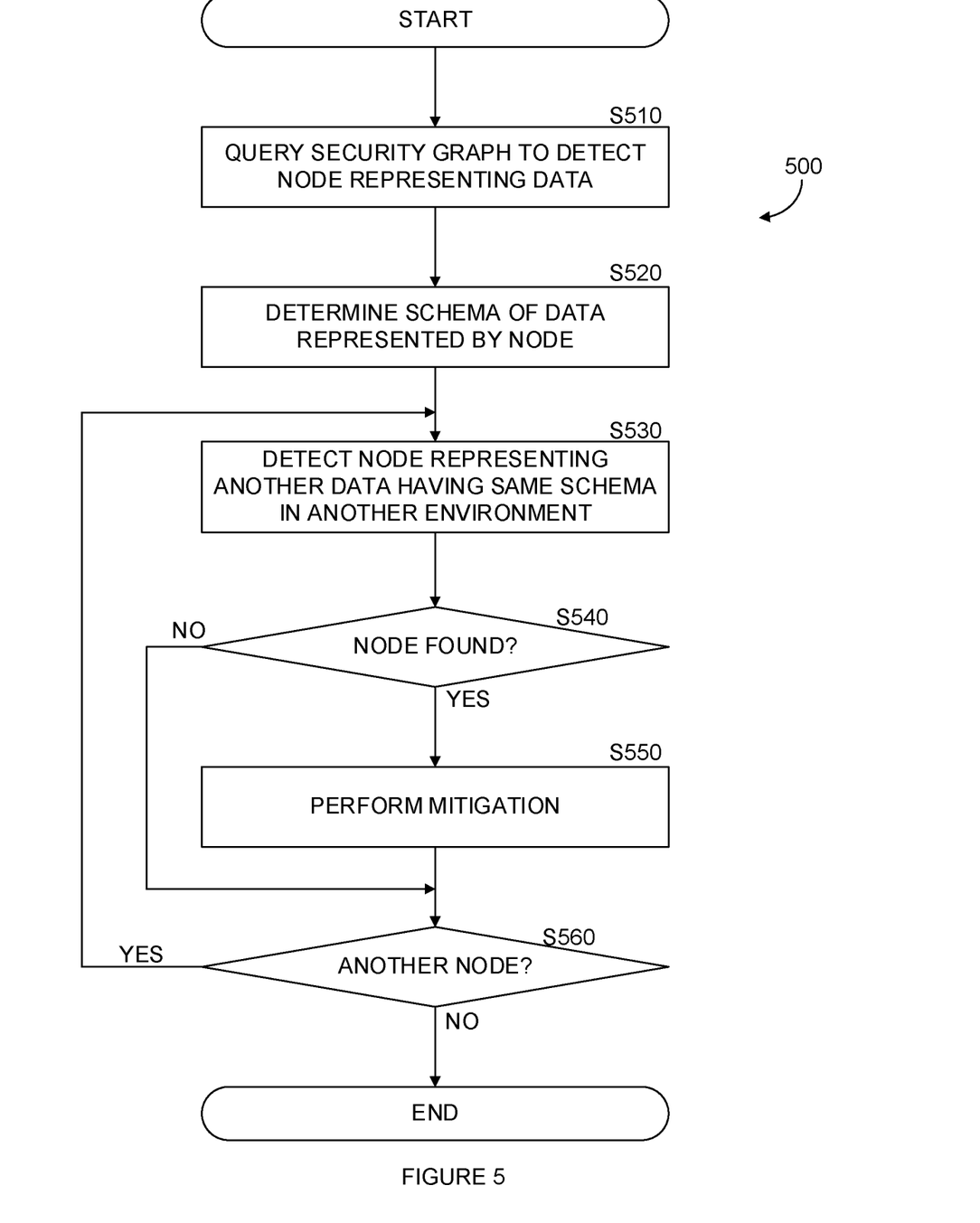
FIG. 5 is a flowchart for mitigating a cybersecurity risk caused by sensitive data detected in an unsecure location, implemented in accordance with an embodiment.

FIG. 5 is an example of a flowchart 500 for mitigating a cybersecurity risk caused by sensitive data detected in an unsecure location, implemented in accordance with an embodiment.

At S510, a security graph is queried to detect a node representing a data file. In an embodiment, each node in the security graph includes a metadata value which indicates a type of cloud entity, enrichment, network element, and the like, which is represented by the node. For example, a value indicating a type may be, in an embodiment, a resource, a principal, an enrichment, a virtual machine, a software container, a serverless function, an application, a database, a data file, a data file type, and the like. In an embodiment, the query, when executed on a graph database having stored therein a security graph, returns an output which includes a node identifier which represents a data file. In certain embodiments, the security graph includes a representation of a cloud computing environment, including a storage, such as a storage service, a database, and the like.

In some embodiments, the security graph is queried to detect a node which represents a data file having sensitive data. For example, a data file node includes, in an embodiment, a metadata value indicating that the data file includes sensitive data. In certain embodiments, the metadata values indicate any one of: PII, PCI, PHI, a combination thereof, and the like.

At S520, a data schema of the detected node is determined. In an embodiment, the security graph may be traversed to determine if the data file node is connected to a data schema node, such as illustrated in the example of FIG. 4 above. A data file node connected to a data schema node indicates that the data file represented by the data file node is generated based on a data schema represented by the data schema node.

At S530, a node representing another data file having the same data schema is detected in another computing environment. Two (or more) data files can share a single data schema, for example, if the second data file is a copy of the first data file, or if the first data file and the second data file are part of a distributed database. For example, a first data file is deployed in a first cloud computing environment, such as a production environment, while a second data file, which is a copy of the first data file, is deployed in a second cloud computing environment, such as a dev environment.

In an embodiment, detecting a node representing another data file includes traversing the security graph to detect a second data file node connected to the data schema node, and determining that the second data file represents a second data file which is deployed in a cloud computing environment which is not the cloud computing environment in which the first data file is deployed. For example, the security graph may be traversed to detect that the second data file node is connected to a bucket node representing a bucket, which is in a different cloud computing environment than a bucket in which the first data file is stored. For example, the bucket node includes, in an embodiment, metadata which indicates an identifier of a cloud computing environment in which the bucket represented by the bucket node is deployed.

At S540, a check is performed to determine if a node representing another data is found. If 'yes' execution continues at S550, if 'no' execution continues at S560.

At S550, a mitigation action is performed. In some embodiments, a mitigation action includes generating an instruction, which when executed generates an alert to indicate that a file having sensitive data is detected in a computing environment in which the file is not supposed to be. In some embodiments, a mitigation action includes generating an instruction which, when executed, configures the cloud computing environment to remove the another data file, for example by deleting the file.

At S560, a check is performed to determine if the security graph should be traversed to detect another node connected to the data schema. If 'yes', execution continues at S530, otherwise execution terminates.

Figure 6:
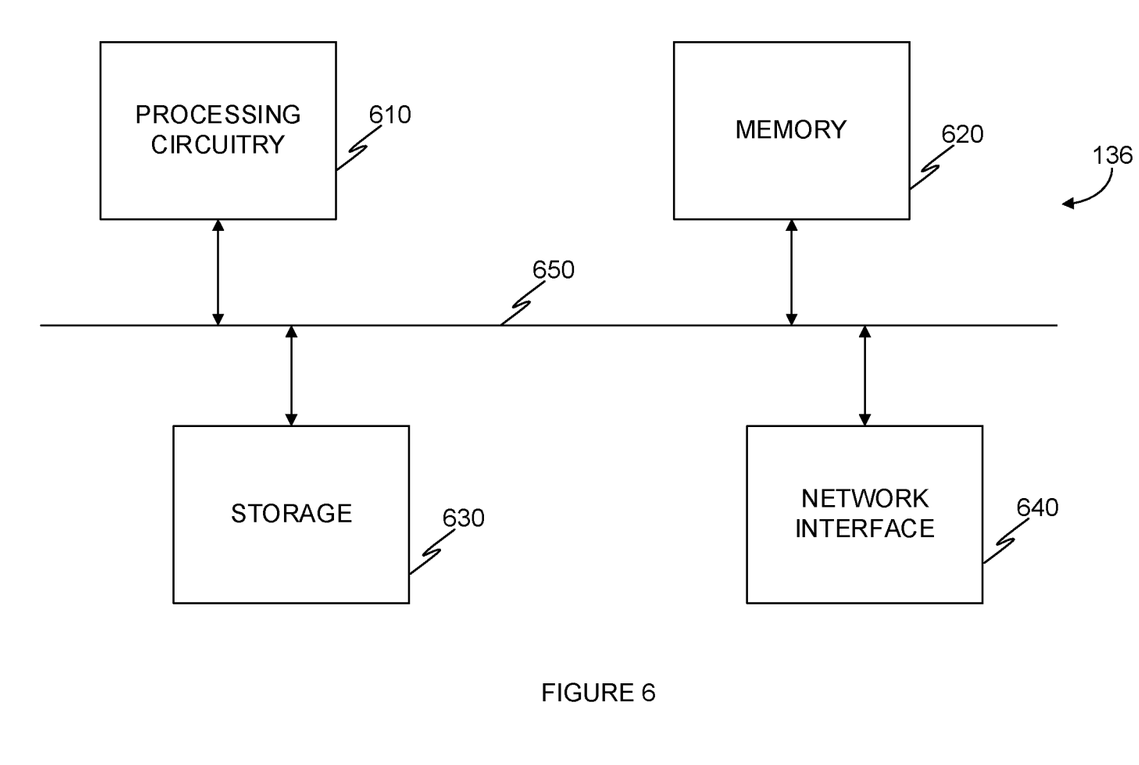
FIG. 6 is a schematic diagram of a data detector according to an embodiment.

FIG. 6 is an example schematic diagram of a data detector 136 according to an embodiment. The data detector 136 includes a processing circuitry 610 coupled to a memory 620, a storage 630, and a network interface 640. In an embodiment, the components of the data detector 136 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the data detector 136 to communicate with, for example, the classifier 132, the graph database 134, the production environment 110, the dev environment 120, and the like.

It should be understood that the embodiments described herein are not limited to the specific architecture illustrated in FIG. 6, and other architectures may be equally used without departing from the scope of the disclosed embodiments.

Furthermore, in certain embodiments the classifier 132, graph database 134, and the like, may be implemented with the architecture illustrated in FIG. 6. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for agentless detection of sensitive data in a cloud computing environment and rendering the same for display, comprising:
   detecting a first data object in a first cloud computing environment, the first data object including a data schema and content;
   detecting a second data object in a second cloud computing environment, the second cloud computing environment associated with the first cloud computing environment, the second data object having the data schema of the first data object, wherein the first data object and the second data object are generated based on the data schema, the data schema including a plurality of integrity constraints;
   generating in a security graph hosted on a graph database: a first data object node representing the first data object, a second data object node representing the second data object, and a data schema node representing the data schema, wherein the security graph further includes a representation of the first cloud computing environment;
   storing a classification based on the content in the security graph, wherein the content is classified as either sensitive data or non-sensitive data;
   rendering an output based on the classification and the data schema node, in lieu of the first data object node and the second data object node, in response to receiving a query to detect a node representing a data object classified as sensitive data;
   generating a first cluster node in the security graph, the first cluster node representing a plurality of data objects having a shared data schema, each data object represented by a node in the security graph, wherein each data object is deployed in the cloud computing environment; and
   generating a second cluster node in the security graph, the second cluster node representing a second plurality of data objects having the shared data schema, each data object represented by a node in the security graph, wherein each data object is deployed in another cloud computing environment, associated with the cloud computing environment.

2. The method of claim 1, wherein the cloud computing environment is a production environment, and the another cloud computing environment is any one of: a development environment, a test environment, and a staging environment.

3. The method of claim 1, further comprising:
   generating the classification further based on any one of: metadata of the first data, the data schema, the content, and a combination thereof.

4. The method of claim 1, further comprising:
   extracting from the first data object a file header, and a plurality of data blocks.

5. The method of claim 1, further comprising:
   classifying sensitive data further as any one of: personal identifiable information (PII), personal health information (PHI), payment card industry (PCI), and any combination thereof.

6. The method of claim 1, wherein the first data object is a file associated with a distributed database.

7. The method of claim 1, wherein the first data object is stored on a storage service of a cloud computing platform on which the cloud computing environment is hosted.

8. The method of claim 1, further comprising:
   initiating a mitigation action in response to determining that the content is classified as sensitive data.

9. The method of claim 8, further comprising:
   initiating the mitigation action in further response to determining that the content is deployed on a data object in a cloud computing environment which is unauthorized for storing sensitive data.

10. The method of claim 8, further comprising:
    generating an instruction which, when executed configures a storage service to delete the first data object, in response to initiating the mitigation action.

11. A non-transitory computer readable medium having stored thereon instructions for causing a processing circuitry to execute a process, the process comprising:
    detecting a first data object in a first cloud computing environment, the first data object including a data schema and content;
    detecting a second data object in a second cloud computing environment, the second cloud computing environment associated with the first cloud computing environment, the second data object having the data schema of the first data object, wherein the first data object and the second data object are generated based on the data schema, the data schema including a plurality of integrity constraints;
    generating in a security graph hosted on a graph database: a first data object node representing the first data object, a second data object node representing the second data object, and a data schema node representing the data schema, wherein the security graph further includes a representation of the first cloud computing environment;
    storing a classification based on the content in the security graph, wherein the content is classified as either sensitive data or non-sensitive data; and
    rendering an output based on the classification and the data schema node, in lieu of the first data object node and the second data object node, in response to receiving a query to detect a node representing a data object classified as sensitive data;
    generating a first cluster node in the security graph, the first cluster node representing a plurality of data objects having a shared data schema, each data object represented by a node in the security graph, wherein each data object is deployed in the cloud computing environment; and
    generating a second cluster node in the security graph, the second cluster node representing a second plurality of data objects having the shared data schema, each data object represented by a node in the security graph, wherein each data object is deployed in another cloud computing environment, associated with the cloud computing environment.

12. A system for agentless detection of sensitive data in a cloud computing environment and rendering the same for display, comprising:
- a processing circuitry; and
- a memory, the memory containing instructions that, when executed by the processing circuitry, configure the system to:
- detect a first data object in a first cloud computing environment, the first data object including a data schema and content;
- detect a second data object in a second cloud computing environment, the second cloud computing environment associated with the first cloud computing environment, the second data object having the data schema of the first data object, wherein the first data object and the second data object are generated based on the data schema, the data schema including a plurality of integrity constraints;
- generate in a security graph hosted on a graph database: a first data object node representing the first data object, a second data object node representing the second data object, and a data schema node representing the data schema, wherein the security graph further includes a representation of the first cloud computing environment;
- store a classification based on the content in the security graph, wherein the content is classified as either sensitive data or non-sensitive data; and
- render an output based on the classification and the data schema node, in lieu of the first data object node and the second data object node, in response to receiving a query to detect a node representing a data object classified as sensitive data;
- generating a first cluster node in the security graph, the first cluster node representing a plurality of data objects having a shared data schema, each data object represented by a node in the security graph, wherein each data object is deployed in the cloud computing environment; and
- generating a second cluster node in the security graph, the second cluster node representing a second plurality of data objects having the shared data schema, each data object represented by a node in the security graph, wherein each data object is deployed in another cloud computing environment, associated with the cloud computing environment.

13. The system of claim 11, wherein the cloud computing environment is a production environment, and the another cloud computing environment is any one of: a development environment, a test environment, and a staging environment.

14. The system of claim 12, wherein the memory contains further instructions which when executed by the processing circuitry further configure the system to:
- generate the classification further based on any one of: metadata of the first data, the data schema, the content, and a combination thereof.

15. The system of claim 12, wherein the memory contains further instructions which when executed by the processing circuitry further configure the system to:
- extract from the first data object a file header, and a plurality of data blocks.

16. The system of claim 12, wherein the memory contains further instructions which when executed by the processing circuitry further configure the system to:
- classify sensitive data further as any one of: personal identifiable information (PII), personal health information (PHI), payment card industry (PCI), and any combination thereof.

17. The system of claim 12, wherein the first data object is a file associated with a distributed database.

18. The system of claim 12, wherein the first data object is stored on a storage service of a cloud computing platform on which the cloud computing environment is hosted.

19. The system of claim 12, wherein the memory contains further instructions which when executed by the processing circuitry further configure the system to:
- initiate a mitigation action in response to determining that the content is classified as sensitive data.

20. The system of claim 19, wherein the memory contains further instructions which when executed by the processing circuitry further configure the system to:
- determine that the content is deployed on a data object in a cloud computing environment which is unauthorized for storing sensitive data; and
- initiating the mitigation action in response to the determination that the content is deployed on a data object in a cloud computing environment which is unauthorized for storing sensitive data.

21. The system of claim 19, wherein the memory contains further instructions which when executed by the processing circuitry further configure the system to:
- generate an instruction which, when executed configures a storage service to delete the first data object, in response to initiating the mitigation action.

22. The method of claim 1, further comprising:
- receiving a query to detect a node representing a data object classified as sensitive data; and
- determining that the first data object includes sensitive data, based on the data schema and the content.

* * * * *

UNITED STATES PATENT AND TRADEMARK OFFICE
CERTIFICATE OF CORRECTION

PATENT NO. : 12,061,719 B2
APPLICATION NO. : 18/049093
DATED : August 13, 2024
INVENTOR(S) : Herzberg et al.

Page 1 of 1

It is certified that error appears in the above-identified patent and that said Letters Patent is hereby corrected as shown below:

In the Claims

Column 17, Line 47, Replace Claim 13 with the following:
13. The system of claim 12, wherein the cloud computing environment is a production environment, and the another cloud computing environment is any one of: a development environment, a test environment, and a staging environment.

Signed and Sealed this
Fifteenth Day of April, 2025

Coke Morgan Stewart
*Acting Director of the United States Patent and Trademark Office*